Dec. 14, 1965 S. L. QUICK ETAL 3,223,359
HELICOPTER FLIGHT CONTROL SYSTEM
Filed March 19, 1964 4 Sheets-Sheet 1

POSITIVE PITCH

INVENTORS
STANLEY L. QUICK
EVERETT W. OPDAHL
BY
Darby & Darby
ATTORNEYS

Dec. 14, 1965  S. L. QUICK ETAL  3,223,359
HELICOPTER FLIGHT CONTROL SYSTEM
Filed March 19, 1964  4 Sheets-Sheet 2
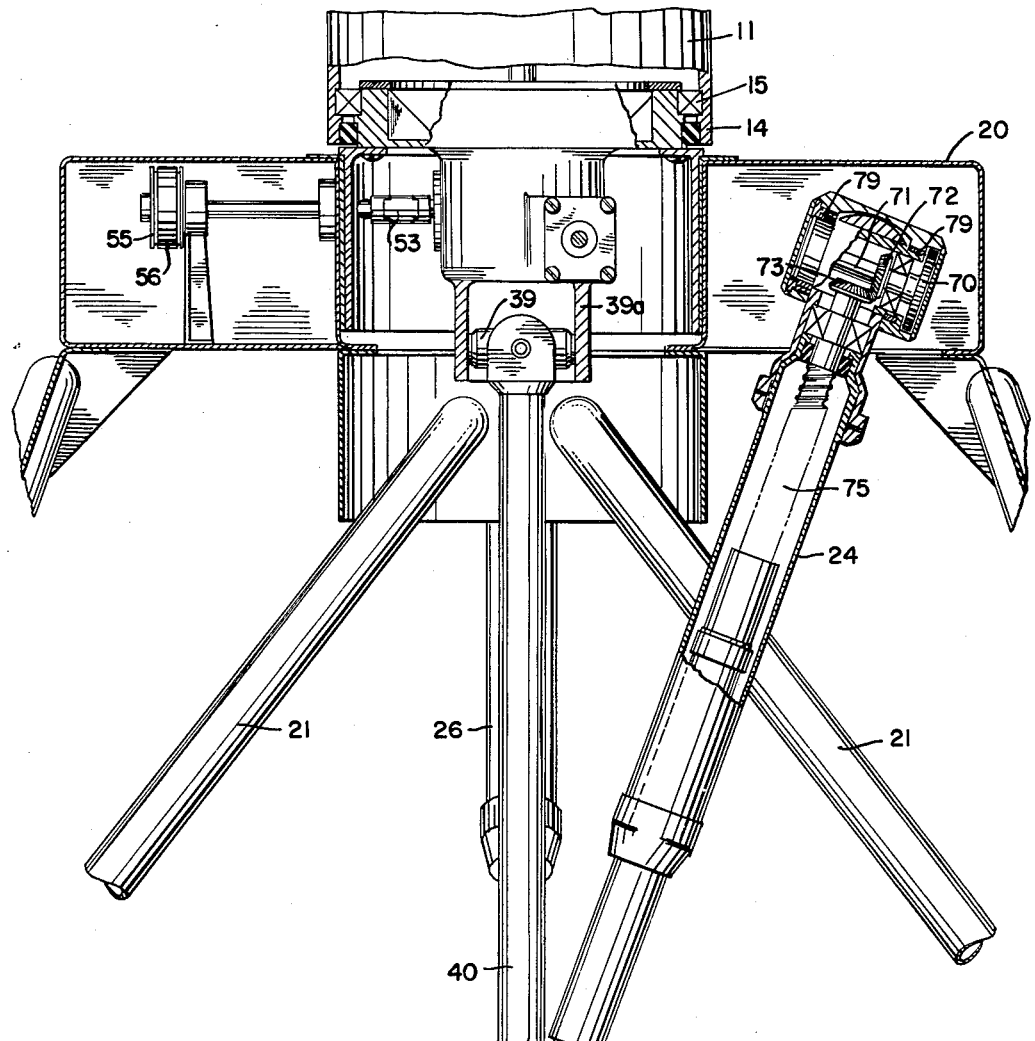
FIG. 2
↑ POSITIVE PITCH DIRECTION
INVENTORS
STANLEY L. QUICK
EVERETT W. OPDAHL
BY
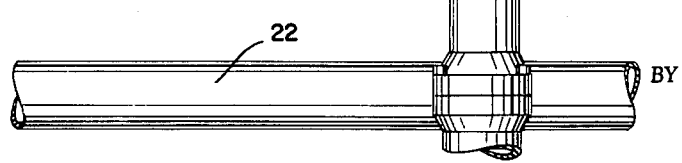
ATTORNEYS INVENTORS
STANLEY L. QUICK
EVERETT W. OPDAHL
BY Darby & Darby
ATTORNEYS Dec. 14, 1965 S. L. QUICK ETAL 3,223,359
HELICOPTER FLIGHT CONTROL SYSTEM
Filed March 19, 1964 4 Sheets-Sheet 4

INVENTORS
STANLEY L. QUICK
EVERETT W. OPDAHL
BY
Darby & Darby
ATTORNEYS

United States Patent Office 3,223,359
Patented Dec. 14, 1965

3,223,359
HELICOPTER FLIGHT CONTROL SYSTEM
Stanley L. Quick, Annapolis, Md., and Everett W. Opdahl, Poughkeepsie, N.Y., assignors to Fairchild Hiller Corporation, a corporation of Maryland
Filed Mar. 19, 1964, Ser. No. 353,168
15 Claims. (Cl. 244—17.13)

This invention relates to helicopter flight control systems and more particularly to a power pick-off and yaw control system for a helicopter.

During the flight of a helicopter forces are produced which cause the helicopter to rotate, or yaw, about the axis of its main rotor. These forces are produced either deliberately, such as when the attitude of the craft is controllably changed in roll or pitch, or accidentally, such as when the craft's attitude is changed by a gust of wind, air pocket, etc.

The present invention relates to a relatively simple mechanism for compensating for the yaw forces in order to prevent the craft from yawing excessively about its rotor axis. In the present invention, which is described as preferably being used with a coaxial rotor type helicopter, yaw control is produced by braking one of the coaxial rotors to produce braking torque. Since the total angular momentum of the helicopter fuselage and rotor system is invariant, the fuselage is caused to rotate in the same direction that the braked rotor turns by the reaction to the braking force, this reaction being produced in order to preserve momentum. If a continuous yaw moment is required, the relative speed of the two rotors changes, thereby producing a torque unbalance which is used to control the vehicle. The selection of the rotor to be braked and the amount of braking torque is automatically controlled in the present invention by yaw sensing devices which produce a control signal corresponding to the yaw of the craft from a predetermined reference point.

The preferred embodiment of the invention described is used in an unmanned helicopter which is tethered by a single cable to a base station, although the principles of the invention may be used in other types of manned or unmanned helicopters. The helicopter is to normally remain vertically above the base station and the height of the craft is controlled at the base station by playing the tethering cable in or out. This produces a tensional force acting along the cable and this force is used to keep the craft flying in a predetermined reference plane, illustratively horizontal, normally with the rotor axis and the cable remaining vertically above the base station. To accomplish this the effective tethering point to which the single cable is connected on the craft is shifted in a manner to cause the tensional force to produce force components which restore the vehicle to its predetermined reference plane. The effective tethering point is shifted by sensing the craft's deviation from the reference plane and producing control signals corresponding to this deviation. These control signals actuate suitable mechanisms on the craft which shift the effective tethering point of the cable with respect to other fixed parts of the craft. In a preferred embodiment of the former arrangement, variable length actuator arms are lengthened or shortened in response to the control signals which are applied to suitable drive mechanism such as clutches. These actuator arms physically shift the tether point of the craft thereby causing a reaction with the tensional force acting on the cable. The shifting of the tethering point is effected in a manner such that the fuselage of the craft will be tilted to produce the forces necessary to restore the craft to the reference plane of its roll and pitch axes.

The power for the actuator arm driving mechanism is taken from the shafts driving the coaxial rotors and the amount of power absorbed from each shaft, i.e. the braking of each shaft, is automatically controlled in response to the control signals to produce the braking torque necessary to control the yawing motion of the craft. The braking torque used to accomplish yaw control is produced in the preferred embodiment of the invention by the same driving mechanisms used to vary the lengths of the actuator arms. Thus, a relatively simple power pick-off arrangement is provided for controlling the flight attitude of the craft on all three axes, roll, pitch and yaw.

It is therefore an object of this invention to provide a system for controlling the yaw motion of a helicopter.

A further object of the invention is to provide apparatus for controlling the yawing motion of a helicopter of the coaxial rotor type in which a braking torque is produced at a selected rotor to produce yaw control.

Another object of the invention is to provide a control system for a helicopter in which roll, pitch and yaw are controlled by two sets of clutches.

A further object of the invention is to provide a helicopter control system for a coaxial rotor helicopter configuration in which pairs of clutches are used to brake a selected rotor shaft to provide yaw control forces.

Still another object of the invention is to provide a helicopter control system in which the power for roll, pitch and yaw control is taken from the helicopter rotor shafts.

Other objects and advantages of the present invention will become more apparent upon reference to the following specification and annexed drawings in which:

FIGURE 2 is a detailed elevational view taken partially in section of a portion of the helicopter vehicle of FIGURE 1;

Figure 1:
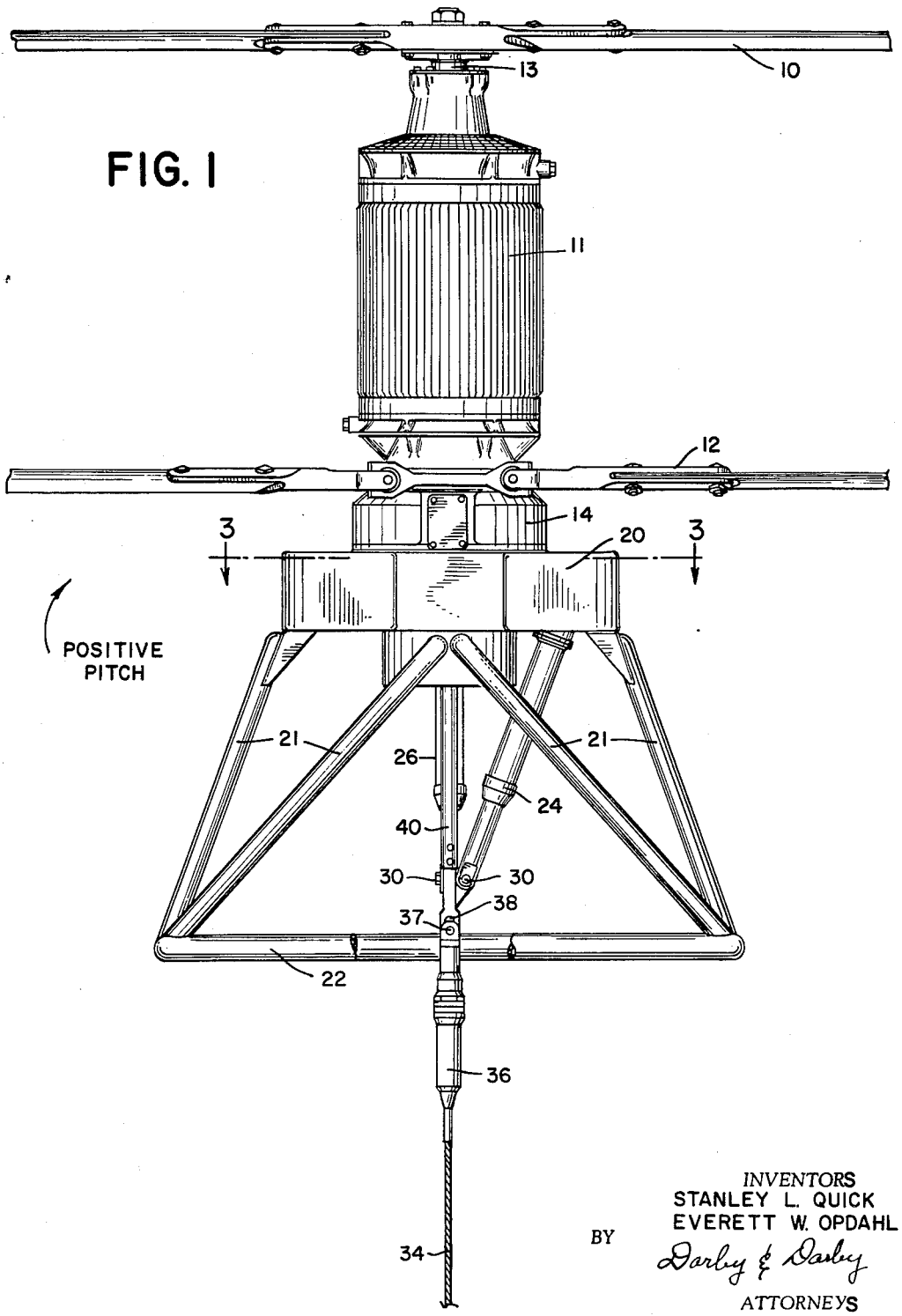
FIGURE 1 is a plan elevational view of a portion of a tethered helicopter craft made in accordance with the present invention.

FIGURE 1 shows a plan view of a tethered helicopter of the coaxial rotor type which utilizes the power pick-off and yaw control system of the present invention. Counter-rotating rotors 10 and 12 are driven by a motor 11 through suitable gear and gear reduction means (not shown). The motor 11 is preferably an electric motor that has a rotor which turns in one direction and an outer casing which turns in the other direction. The upper rotor 10 is coupled to the motor rotor through the shaft 13 while the lower rotor 12 is coupled to the motor outer casing through the coupling means 14 which rotates in the opposite direction on the bearings 15 (FIGURE 2). Thus, the rotor torques are normally exactly balanced unless some other force is applied. As can be seen in FIGURE 1 the blades of rotors 10 and 12 are of simple, fixed construction and do not have the articulated construction normally associated with cyclic and collective pitch controls these controls not being used with the preferred embodiment being described.

As shown best in FIGURE 2, the motor 11 is mounted to a housing 20 which contains the attitude sensing devices and a portion of a tether point shifting drive mechanism. Suspended from the housing 20 is a frame-work fuselage formed by side rails 21 and lower rails 22 located therearound. The housing 20 is illustratively of generally rectangular shape and the fuselage frame-work flares out from top to bottom. The exact shape of the fuselage is not critical.

The upper driven ends of two variable length actuator arms 24 and 26 are mounted for universal motion to the housing 20. The upper ends of these arms are spaced preferably in the range from approximately 90° to approximately 120° apart around the axis of the rotors and are connected to drive mechanisms for varying their lengths. These drive mechanisms are described below. The lower ends of the actuator arms 24 and 26 come together and are connected to a bi-directional universal joint 38 which, for example, is of the cardan type. The joint 38 is located at the bottom of a tubular member 40 whose upper end is mounted in a bi-directional swivel joint 39 located at the bottom of the rotor gear box power pick-off 39a. The lower ends of arms 24 and 26 respectively terminate in spherical bearing joints 30 which are connected to the universal joint 38. The exact location of the joint 38 from the motor and other parts of the craft under normal flight conditions is dependent upon the location of the craft's center of gravity and other constructional factors. Under normal flight conditions with the vehicle in its reference plane the joint 38 is located approximately in the center of the rails 22. It is shifted from this position, as force correcting moments are to be produced, by varying the lengths of the arms 24 and 26.

A tethering cable 34 (FIGURE 1) is connected to the joint 38 by a connector 36. The end of the connector 36 has a pin 37 which fits to the joint. Thus, the connector 36 and the lower ends of arms 24 and 26 are free to pivot about the universal joint 38 with the pin 37 forming the tether point of the helicopter.

The tethering cable 34 is played out to the helicopter from a winch located at a ground or base station (not shown) which is either fixed or relatively slow moving. The cable is played out a suitable amount depending upon the altitude to which it is desired to have the helicopter ascend or descend. As should be obvious, the rotors 10 and 12 provide a force which will lift the vehicle against the restraining force of the cable 34. The restraining force of the cable and lift force of the helicopter are selected so that the cable force cannot be overcome by the lift force. This altitude control of the craft by the winch at the base station eliminates the need for collective pitch control. At the same time a tensional force is produced along the cable in opposition to the lift force.

The tethering cable 34 preferably carries electrical energy from the base station to operate the motor 11. Therefore, the cable has inner conductors (not shown) for this purpose and it also has an outer cover of metal or other similarly strong material to provide the strength necessary to handle the various tensional forces acting on the tethering cable. The inner wires which carry the electrical current extend through a tubular member 40 into the motor housing area. The motor 11 is provided with slip rings or some other type of pick-up device for utilizing the current supplied from the base station.

The length of the two actuator arms 24 and 26 are varied to controllably shift the effective tethering point of the vehicle. This produces a reaction between the tension force on the cable and the helicopter so that the helicopter fuselage is tilted. The variation in the lengths of these two arms is carried out in accordance with the attitude of the helicopter with respect to the reference plane, normally horizonal, measured by attitude sensing devices located within the housing 20. These will be described below. By shifting the effective tethering point of the craft force moments are produced on the cable 34 which are used to restore the helicopter to its reference plane of normal flight, this preferably being in which the tethering cable 34 is substantially vertical above the base station. During the level flight conditions the tethering point at the joint 38 and the helicopter fuselage have a predetermined positional relationship with respect to one another, and this positional relationship is changed upon movement of the actuator arms.

Figure 3:
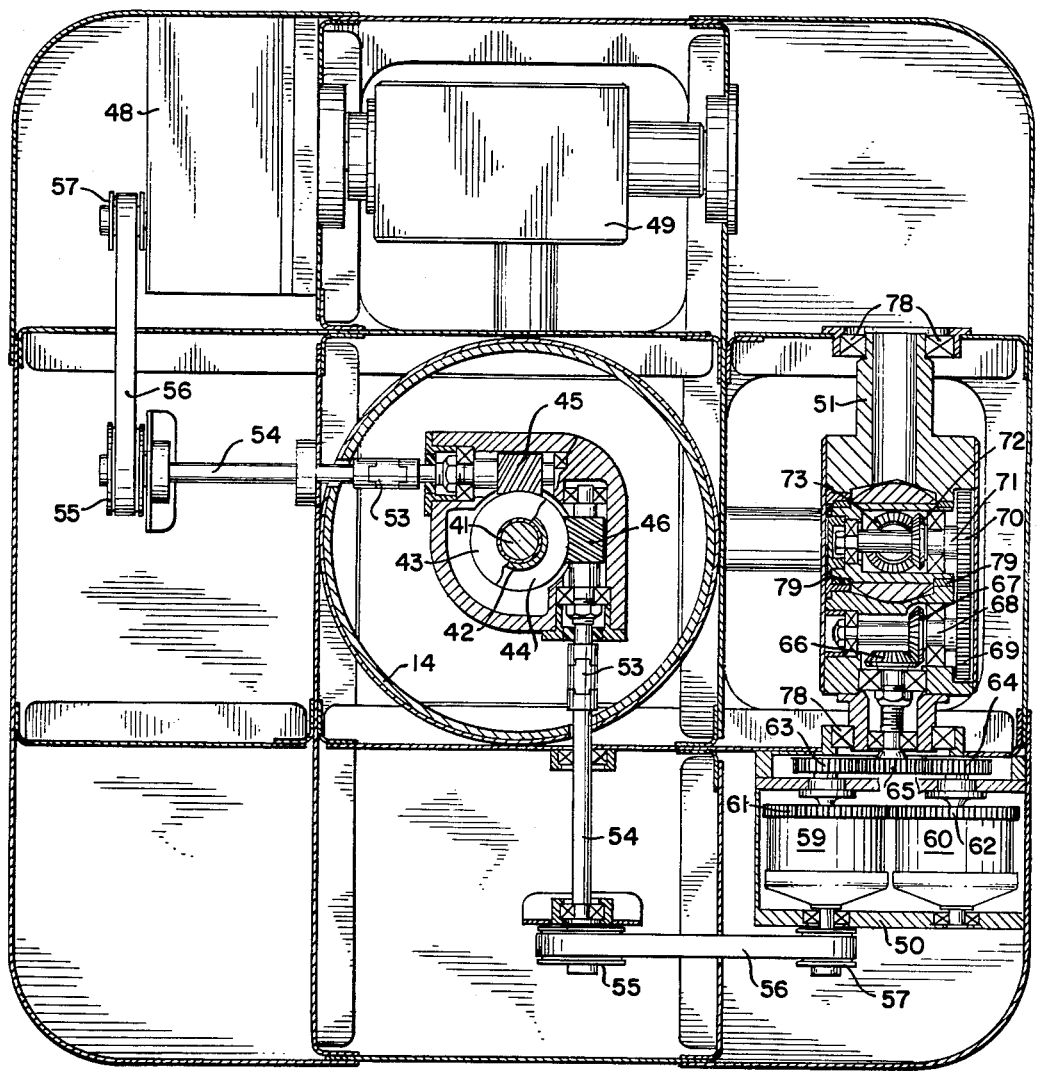
FIGURE 3 is a top elevational view taken in section along lines 3—3 of FIGURE 1.

FIGURES 2 and 3 are detailed views of the actuator arms and the drive control mechanisms therefor. The rotor of motor 11 and the outer casing turn respective coaxial counter-rotating shafts 41 and 42. These shafts carry respective helical drive gears 43 and 44 which mate with respective driven helical gears 45 and 46. The movement of the helical gears 45 and 46 drive respective, cooperating clutch assembly and drive control mechanism combinations 48–49 and 50–51. Since each of the clutch assembly and drive control mechanism combinations are the same only one will be described, this being the one actuated by the helical gear 46. The same explanation applies to the the clutch assembly and drive control mechanism.

As seen in FIGURE 3, a mechanical coupling 53 connects the driven helical gear 46 to a shaft 54 which has a pulley 55 connected at the end thereof. Pulley 55 rotates a drive belt 56 at whose other end is a pulley 57 which is connected to and turns the outer casing of a first clutch 59 of the clutch assembly 50. Clutch assembly 50 contains a second clutch 60 of similar construction as clutch 59 and both clutches have rotating outer casings on which are mounted mating ring gears 61 and 62. Therefore the two outer casings for the clutches rotate in opposite directions by virtue of the driving of the casing of clutch 59.

The clutches 59 and 60 preferably are of the conventional magnetic type in which the amount of clutch engagement and output torque is varied by applied control or bias signals which orient magnetic particles or other similar material in the clutch. These control or bias signals are supplied from the attitude sensing devices located in the housing 20, as will be described.

The two clutches 59 and 60 have respective output gears 63 and 64 each of which rotates in a direction to the rotation of ring gears 61 and 62 on the outer casings of clutches 59 and 60. The output gears produce a quantity of output torque dependent upon the magnitude of the energization signal received by the clutches. Turning either of the output gears 63 or 64 causes a central drive gear 65 to rotate in a direction opposite to the rotation of the mating driving gear 63 or 64. Drive gear 65 is connected to the mechanism for lengthening or shortening the actuator arm 24 in accordance with the direction of its rotation.

Drive gear 65 turns a set of bevel gears 66 and 67. The latter bevel gear 67 is mounted on a shaft 68 having a rotating spur gear 69 at the end thereof. Gear 69 drives a mating spur gear 70 located on a shaft 71 which has a bevel gear 72 fixed thereto. Bevel gear 72 in turn drives a mating bevel gear 73 which is at the top of the threaded arm of a conventional ball and nut mechanism 75 inside the upper portion of the actuator arm 24. Rotation of the threaded arm 75 by the output clutch gear 65 in one direction or the other, turns the ball and nut mechanism 75 and causes the length of actuator arm 24 to be lengthened or shortened accordingly. It should be understood that the clutch assembly 48, drive mechanism 49 and other apparatus is the same for moving the actuator arm 26.

The drive control mechanism 51 is universally mounted to the housing by the bearings 78 and 79. A similar set of bearings is provided for drive control mechanism 49. Thus, the upper and lower ends of the actuator arms are both free to move in the respective universal mountings, and the tube 40 to move about pivot 39. Depending upon the lengthening or shortening of the actuator arms the effective tethering point of the vehicle, i.e. the position of joint 38 and the pin 37, is shifted to change the force moments produced by the tension of cable 34.

If, for example, the movement of actuator arm 24 is made responsive to deviations in roll attitude and the movement of arm 26 made responsive to deviations in pitch attitude of the craft and its rotor axis from a predetermined reference position, then the force moments needed to restore the vehicle to its reference plane can be readily produced by varying the lengths of the arms, either singly or at the same time, in the proper direction and in the proper amount. This is done by providing control signals to the clutch assemblies 48 and 50 in accordance with the deviation of the vehicle from the predetermined reference plane. These control signals effect shifting of the tethering point in the proper direction and magnitude so that reaction forces are produced with the tension force acting on the cable. The direction of these reaction forces is such as to restore the helicopter to its reference plane.

Figure 4:
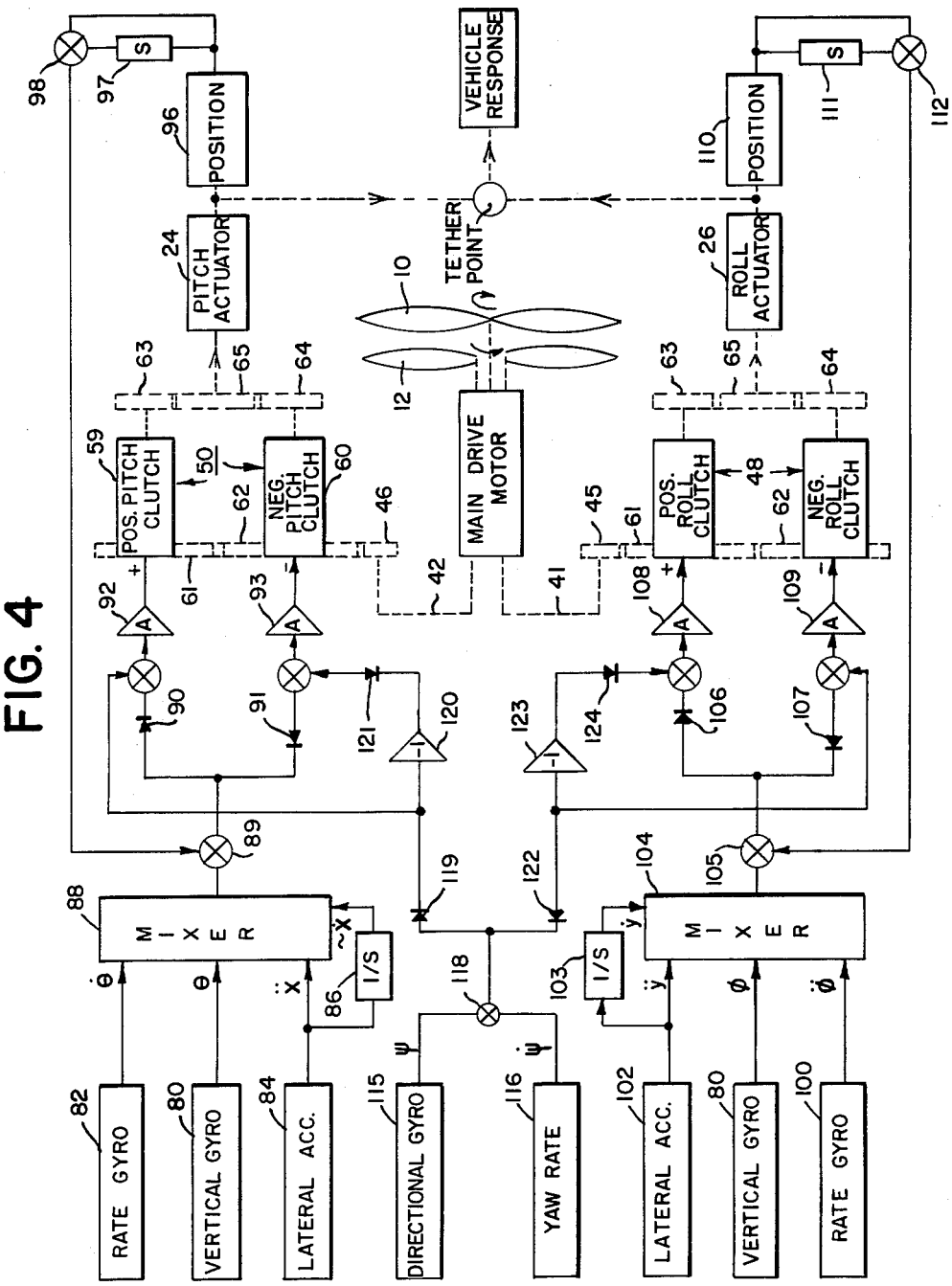
FIGURE 4 is a schematic block diagram of the attitude sensing circuits for controlling the helicopter.

FIGURE 4 is a schematic diagram of a preferred form of attitude sensing circuit for supplying signals to control the clutches in the two assemblies 48 and 50. The control package is divided into three portions for deriving pitch, yaw and roll control signals. The pitch control signal is derived in the following manner. A vertical gyro 80 produces a signal ($\theta$) of the deviation of the helicopter from a horizontal level in the longitudinal (pitch) direction and a rate gyro 82 produces a signal ($\dot{\theta}$) corresponding to the rate at which this pitch deviation takes place. A lateral accelerometer 84 measures the longitudinal component of the lateral acceleration to produce a lateral acceleration signal ($\ddot{X}$). A portion of this acceleration signal is integrated in an integrator 86 to produce a lateral velocity signal ($\dot{X}$).

The various signals from components 80, 82, 84 and 86 are combined in a mixer circuit 88 whose output is a composite control signal used to actuate the respective clutches for moving pitch actuator arm 24. Clutch 59 is now called the positive pitch clutch since it shortens arm 24 to effect upward tilt of the fuselage while clutch 60 is called the negative pitch clutch since it lengthens arm 24 to effect downward tilt of the fuselage.

The signal at the output of mixer 88 is applied through a combining circuit 89 to respective positive and negative signal steering diodes 90 and 91. As should be clear, the polarity of the signal at the output of the combining circuit 89 is positive or negative depending upon the pitch, up or down, of the helicopter with respect to the horizontal or some other reference plane and the magnitude of the signal depends upon the amount of pitch. The positive polarity signal passing through steering diode 90 is applied to the input of a positive pitch clutch amplifier 92 while the negative polarity signal is steered through the diode 91 to the input of a negative pitch clutch amplifier 93. Depending upon the polarity of the control signal present at the output of combining circuit 89 either the positive or negative pitch clutch 59 or 60 is actuated. This moves the ball and nut mechanism of actuator arm 24 through the respective gears 63, 64 and 65 to either lengthen or shorten the arm. The movement of the arm is effectuated to produce a restoring control force for the helicopter which will react with the tension force on the cable to right the helicopter for level flight in its reference plane.

A follow-up device 96 is connected to the pitch actuator arm 24. The device 96 is a potentiometer or other similar arrangement which produces a voltage corresponding to the position of the pitch actuator arm. This voltage is applied both directly and through a velocity or differentiating circuit 97 to a combining circuit 98. The combined follow-up and velocity signals are applied back through the combining circuit 89 as a negative going feedback signal at the inputs of amplifiers 92 and 93. The feedback signal determines the operating position and prevents hunting of the pitch actuator arm. This type of servo control arrangement is well known in the art.

The movement of the pitch actuator of arm 24 is carried out until the arm is at such a position to produce a restoring force which will tend to right the helicopter to the predetermined reference position. When the helicopter approaches this reference plane the pitch actuator arm 24 is at a predetermined positional relationship with respect to the rest of the craft such that the cable force moment maintains the helicopter in its desired attitude.

The shifting of the tethering point to produce correction in the roll attitude, i.e. 90° from the pitch axis, is accomplished by the actuator arm 26. Control signals for controlling clutch assembly 48 and drive mechanism 49 are produced to lengthen or shorten actuator arm 26 by circuits similar to those used to control the pitch actuator arm. A roll deviation signal ($\phi$) is produced by a separate pick-off on the vertical gyro 80 and a roll rate signal ($\dot{\phi}$) produced by a rate gyro 100. An accelerometer 102 produces a signal ($\ddot{Y}$) corresponding to the later component of acceleration in the roll direction which is integrated by an integrator circuit 103 and the resultant signal, which is proportional to the lateral velocity ($\dot{Y}$) in the roll direction, is applied to one input of a mixer 104. The mixer 104 also receives the lateral acceleration, the roll deviation and the roll rate signal.

The composite output signal of mixer 104 appears at a combining circuit 105 and is of a positive or negative polarity depending upon whether the roll of the aircraft is in the plus or minus direction about the roll axis. The positive and negative signals are steered through respective diodes 106 and 107 to the inputs of a positive roll clutch amplifier 108 and a negative roll clutch amplifier 109. The control signals applied to amplifiers 108 and 109 control the positive and negative roll clutches in assembly 49 to lengthen or shorten the actuator arm 26 to effect tilt of the fuselage and rotors in the proper direction. A positional follow-up device 110, velocity circuit 111, and combining circuit 112 for combining the positional and velocity signals are also provided to produce the negative feedback signal for application back to combining means 105 to measure tether point position and to prevent hunting of the roll actuator arm 26.

To summarize the action of arms 24 and 26, when the helicopter is hovering in zero wind, control of the helicopter in roll and pitch directions is automatically accomplished by sensing the deviation of the helicopter with respect to a predetermined reference plane and producing signals corresponding to this deviation. These signals are used to actuate respective clutches to lengthen or shorten actuator arms 24 and 26 which shifts the effective tether point. Shifting the tether point causes a reaction with the tension force acting along cable 34 to produce other force components acting about the vehicle center of gravity. These force components tilt the fuselage in the proper direction so that the force components so produced act to restore the helicopter to its reference plane. As the restoring action occurs the roll and pitch control signals become progressively smaller in magnitude until finally the control signals are zero at which time the vehicle is flying in its normal condition and the actuator arms 24 and 26 are at their normal lengths and the tether point is back at its original positional relationship with respect to the fuselage, for normal flight. It should be understood that both the roll and pitch actuator arms can act simultaneously to produce restoring forces on both axes at the same time.

It can thus be seen that the power taken from the rotating shafts 41 and 42 is used to drive a pair of clutches in each of two clutch assemblies. These clutch assemblies in turn control the shifting of the tether point to produce roll and pitch correcting force moments. Thus, the flight of the helicopter is controlled by a relatively simple mechanism operated directly from the helicopter rotor shafts.

When the helicopter shifts from a level flight condition as it pitches or rolls, force moments occur which make the helicopter rotate, or yaw, around its rotor axis. Yawing is also produced when power is absorbed from one or the other of the two shafts 41 and 42 to control the tilting of the helicopter on its roll or pitch axis. This yawing is desirably eliminated since it may twist the tethering cable and it also detracts from the flight stability of the vehicle.

In accordance with the present invention yawing is compensated for by producing or absorbing torque loads which act around the vehicle's rotor axis. In the more common helicopter configurations which use a large central rotor and a smaller auxiliary tail rotor, the tail rotor operates to produce the additional torque necessary to control the yawing. However, this type of additional torque control increases the size and complexity of the helicopter and is not necessary in a coaxial type configuration. The relatively simple manner in which yaw control is taken care of by the present invention in a coaxial rotor configuration is described below.

In a helicopter of the coaxial type the two rotors normally produce equal torque output. When one of the rotors has a braking torque applied thereto, the helicopter fuselage is at the same time carried along by the reaction to the braking torque in the same direction as the rotation of the braked rotor. This occurs because the total angular momentum of fuselage-rotor system is invariant and if one rotor is slowed down then the fuselage will start to rotate in the direction of rotation of the slower moving rotor in order to preserve momentum. By varying the braking torque on a rotor, i.e. braking it, a desired yaw control moment impulse can be obtained to restore the vehicle to a predetermined reference point or to obtain any desired yaw.

In accordance with the present invention yaw control is accomplished in a relatively simple manner by energizing the same clutches which are used to control the actuator arms 24 and 26 to produce a braking torque to brake the connected rotor shaft. By doing this an unequal torque balance is produced between the two rotors so the vehicle will yaw, or rotate, in one direction or the other depending upon which rotor shaft is braked.

As described above, the output shafts 41 and 42 are respectively connected to the rotor shaft 13 and the rotor casing 14 of the motor 11 which turn the upper and lower rotors 10 and 12 respectively. Each of the shafts 41 and 42 drives a respective clutch assembly 49 and 50 through the belt and pulley drive elements 53–57. As the clutches of a respective clutch assembly are provided with a greater magnitude control signal, the braking of the respectively connected shaft increases proportionately. Therefore the resultant yaw force moment produced by braking the rotor connected to that shaft also increases proportionately.

It should be understood that if only one clutch of a respective assembly is energized a roll or pitch force moment is produced through the motion of the tether point along with the resultant yaw force moment. Thus, energization of only one clutch of a pair to control yaw motion will also cause the helicopter to roll or pitch in one direction or the other depending upon which clutch of the pair is energized. The production of the undesired roll and pitch moments can be overcome by energizing both the positive and negative clutches of an assembly 49 or 50 by the same amount and at the same time. When this is done the braking of the respectively connected shaft and rotor is increased, thereby providing yaw control, without causing a corresponding change in roll or pitch attitude of the helicopter. Thus, controlled yawing motion in one direction or the other can be obtained with the counter-rotating shafts 41 and 42 by energizing the clutch pair of the proper clutch assembly with control signals of the same magnitude. This causes one of the shafts to be braked with a consequent yawing motion in the direction of rotation of the rotor connected to that shaft.

The clutches are controlled to produce the yaw force moments in the following manner. Deviation in yaw of the vehicle from a reference point is sensed by a directional gyro 115 to produce a first signal ($\psi$) while the rate of yaw is sensed by a yaw rate gyro 116 which produces a second signal ($\dot{\psi}$). The yaw and yaw rate signals are combined in a circuit 118 to produce a composite deviation signal.

The composite deviation signal corresponding to one direction of yaw, which for example is represented by a positive signal, is applied from the combining circuit 118 and through a positive poled signal steering diode 119 to the input of the positive pitch control amplifier 92. This signal is also inverted in a unity gain inverting amplifier 120 and applied through a negative poled signal steering diode 121 to the input of negative pitch clutch amplifier 93. When the two clutches 59 and 60 of assembly 50 are energized by signals of equal magnitude, their output torques are equal and the output gear 65 does not rotate. Thus, the actuator arm 24 remains stationary and the tether point is not shifted. However, because power is absorbed from the shaft 42 to energize the two clutches 59 and 60, the connected rotor is braked and the helicopter yaws in the direction of rotation of the braked rotor.

The composite deviation signal corresponding to the other direction of yaw, which for example is represented by a negative polarity signal, is used to control the two clutches in the roll clutch control assembly 48, which is driven by the other rotor shaft 41. Here the signal at the output of combining circuit 118 is applied through a negatively poled signal steering diode 122 to the input of the negative roll clutch amplifier 109. The negative polarity composite yaw deviation signal is also inverted to a positive signal by unity gain amplifier 123 and the inverted signal is steered through a positively poled diode 124 to the input of positive roll clutch amplifier 108. Since the signals at the inputs of the two amplifiers 108 and 109 are of equal magnitude there is no shifting of the tether point and no roll force moment. However, the shaft 41 is braked to cause yawing of the craft in the direction or rotation of its connected rotor. Thus equal energization of the clutches in assembly 48 causes a yawing of the craft in a direction opposite to that produced by equal energization of the clutches in assembly 50.

It should be clear that the yaw correction force moments may also be produced at the same time that roll or pitch correcting force moments, or both, are being produced. This is accomplished by using the yaw control signals to bias both of the clutches in an assembly by an equal amount, thereby producing a predetermined amount of braking torque to produce yawing, while at the same time also applying any roll or pitch deviation signal, or both, derived in the manner described above, to the clutch assemblies. This will make the clutches of a respective pair have unequal outputs and cause it to produce both yaw and roll or pitch correcting forces. Therefore, yaw control can be obtained in one direction or the other while at the same time obtaining roll or pitch control or any combination thereof.

Therefore it can be seen that a simple arrangement has been provided for establishing orientational stability of a helicopter in flight and particularly an arrangement for taking power from the rotor shafts and using the power to provide roll, pitch and yaw control. While the invention has been described with respect to use with a tethered helicopter it should be understood that it has equal applicability to other types of tethered or free flight unmanned or manned helicopters of the coaxial rotor type. Also, there is no restriction to be implied to limit the scope of the invention to a helicopter tethered by a signal cable and/or having automatic roll and/or pitch control since the roll and pitch controls may be provided manually or by using cyclic pitch derived either automatically or manually. In the manual roll and pitch control arrangement yaw of the helicopter is automatically compensated by retaining both clutch assemblies 48 and 50 but by removing the roll and pitch attitude sensing components and leaving only the yaw sensing components. As before one or the other of the clutch assemblies is energized depending upon the deviation of the helicopter in yaw from a predetermined point.

It should also be understood that the present invention may be used with any type of power plant either electric or those using solid or liquid fuels. Also, the invention will operate equally well on helicopters of the type using jet motors at the tips of the rotor blades. Also, other types of tether point shifting arrangements such as those disclosed in the copending application of Stanley Quick, Serial Number 352,737 filed March 18, 1964 and entitled Tethered Helicopter, which is assigned to the same assignee, may be used.

While preferred embodiments of the invention have been described above, it will be understood that these are illustrative only, and the invention is limited solely by the appended claims.

What is claimed is:

1. In a helicopter of the type having counter-rotating rotor shafts the combination comprising
   means for controlling the attitude of the helicopter in roll and pitch planes,
   a power drive means connected between each respective rotor shaft and said attitude control means,
   and means for operating a respective power drive means to absorb power from the connected shaft to produce a force for controlling the yaw motion of the helicopter.

2. In a helicopter of the type having counter-rotating rotor shafts the combination comprising
   means for controllably shifting the flight attitude of the helicopter in roll and pitch planes of flight,
   a respective power pick-off and drive means connected between each said rotor shaft and said attitude control means for operating the latter,
   means for sensing the deviation of the helicopter in yaw from a predetermined reference location and for producing a control signal representative thereof,
   and means responsive to said control signal for operating a respective power pick-off and drive means to brake the connected rotor shaft to produce a yaw force moment for restoring the helicopter to said predetermined reference location without producing unwanted deviations in roll and pitch flight attitude.

3. In a helicopter of the type having counter-rotating rotor shafts the combination comprising
   means for sensing the deviation in flight attitude of the helicopter from predetermined roll and pitch planes and for producing roll and pitch deviation control signals corresponding thereto,
   respective first and second means for controllably shifting the flight attitude of the helicopter in roll and pitch planes of flight,
   a respective power pick-off and drive means connected between one of said rotor shafts and one of said first and second flight attitude shifting means for operating the latter to change the attitude of the helicopter, each said power pick-off and drive means being responsive to a respective deviation control signal produced by said sensing means,
   means for sensing the deviation of the helicopter in yaw from a predetermined reference location and for producing a yaw deviation control signal,
   and means responsive to said yaw deviation control signal for operating one of said power pick-off and drive means to brake the respectively connected rotor shaft to produce a yaw force moment without producing a roll or pitch force moment.

4. The combination as set forth in claim 3 wherein each said power pick-off and drive means is of the differential type and responds to the corresponding roll or pitch deviation control signal to produce a differential power output to shift the flight attitude in one direction or the other on the corresponding flight axis, each of said power pick-off and drive means being responsive to said yaw deviation control signal to brake the connected rotor without producing a differential output.

5. In a helicopter having a rotating rotor shaft the combination comprising
   means for controlling the attitude of the helicopter on an axis of flight,
   a differential power drive means connected between said rotor shaft and said control means, said power drive means operating to produce a differential output to move the control means to change the direction of flight in a first or a second direction on said axis of flight,
   and means for operating said power drive means to operate said control means without changing the direction of flight on said axis and to brake said rotor shaft to produce a yaw force moment acting on said helicopter.

6. In a helicopter of the type tethered by a cable and having counter-rotating rotor shafts the combination comprising
   means for sensing the deviation in roll and pitch attitude of the helicopter with respect to a reference plane and for producing control signals representative thereof,
   means for tethering said cable to the helicopter at a single point thereon,
   means responsive to said control signals for controllably shifting the tether point,
   power pick-off means connected to the counter-rotating shafts for driving said tether point shifting means,
   means for sensing the yaw attitude of the helicopter with respect to a predetermined reference location and for producing a control signal representative thereof,
   and means responsive to said yaw control signal for controlling said power pick-off means to brake one of the shafts to restore the helicopter in yaw attitude to said predetermined reference location.

7. In a helicopter of the type tethered by a single cable and having counter-rotating rotor shafts the combination comprising
   means for sensing the deviation in roll and pitch attitude of the helicopter with respect to a reference plane and for producing corresponding roll and pitch deviation control signals,
   means for tethering said cable to the helicopter at a single point thereon,
   first and second means for shifting the tethering point on a respectively different axis,
   a first power pick-off means connected between one of said rotor shafts and said first shifting means and a second power pick-off means connected between the other of said rotor shafts and said second shifting means, said first and second power pick-off means being respectively responsive to said roll and pitch deviation control signals to control said first and second shifting means respectively,
   means for sensing the yaw attitude of the helicopter with respect to a reference location and for producing a yaw deviation control signal representative thereof,
   and means responsive to said yaw deviation control signal for energizing one of said power pick-off means to absorb power from the respectively connected rotor to produce a yaw force moment to restore the yaw attitude of said helicopter to said predetermined reference location.

8. A yaw attitude control system for a helicopter having counter-rotating shafts comprising
   means on said helicopter for sensing the deviation in yaw from a predetermined reference location and for producing a control signal representative thereof, first and second clutch assemblies, each said assembly having differentially connected clutches with the amount of energization of each clutch in an assembly being responsive to said yaw deviation control signal, power pick-off means connected between a respective rotor shaft and a clutch assembly, and means responsive to said yaw deviation control signal for energizing the clutches of an assembly by equal amounts thereby braking the respectively connected rotor shaft and producing a yaw force moment.

9. An attitude control system for a helicopter having counter-rotating rotor shafts comprising means on said helicopter for sensing deviation of the helicopter in roll and pitch from a reference plane and for sensing deviation in yaw from a predetermined reference location, said sensing means also producing corresponding roll, pitch and yaw deviation control signals, first and second clutch assemblies, each said assembly having first and second clutches and output drive means connected thereto, the amount of energization of each clutch in an assembly and the direction of motion of the output drive means being responsive to one of said roll and pitch deviation control signals, power pick-off means connected between a respective rotor shaft and a clutch assembly, means connected to the output drive means of said clutch assemblies for controlling the flight attitude of the helicopter, and means responsive to said yaw deviation control signal for energizing the clutches of an assembly by equal amounts to brake the respectively connected rotor shaft thereby producing a yaw force moment.

10. An attitude control system for a helicopter having counter-rotating rotor shafts, said helicopter being tethered by a cable, comprising means for connecting said cable to said helicopter at a point thereon, means on said helicopter for sensing deviation of the helicopter in roll and pitch from a reference plane and for sensing deviation in yaw from a predetermined reference location, said sensing means also producing corresponding roll, pitch and yaw deviation control signals, first and second clutch assemblies, each said assembly having first and second clutches and a bi-directional output drive means, the amount of energization of each clutch in an assembly and the direction of motion of the output drive means being responsive to one of said roll and pitch deviation control signals, power pick-off means connected between a respective rotor shaft and a clutch assembly, means connected to the output drive means of each clutch assembly for shifting the tethering point, and means responsive to said yaw deviation control signal for energizing the clutches of an assembly by equal amounts to brake the respectively connected rotor shaft thereby producing a yaw force moment.

11. An attitude control system for a helicopter having counter-rotating rotor shafts, said helicopter being tethered by a cable, comprising means for connecting said cable to said helicopter at a point thereon, means on said helicopter for sensing deviation of the helicopter in roll and pitch attitude from a reference plane and for sensing deviation in yaw from a predetermined reference location, said sensing means also producing corresponding roll, pitch and yaw deviation control signals, first and second clutch assemblies, each said assembly having first and second clutches, the amount of energization of each clutch in an assembly being responsive to one of said roll and pitch deviation control signals, power pick-off means connected between a respective rotor shaft and a clutch assembly, an output drive means for movement by the respective clutches of each assembly, the direction of rotation and torque output of said output means being dependent upon the degree of energization of each clutch in a respective clutch assembly, a movable length actuator arm having one end connected to and driven by the output drive means of each clutch assembly, means for connecting the other end of each actuator arm to said tether point, means responsive to the roll and pitch deviation control signals for energizing the clutches of a respective assembly to vary the length of the actuator arm thereby shifting said tether point, and means responsive to a yaw deviation control signal for energizing the clutches of an assembly by equal amounts to brake the respectively connected rotor shaft and thereby produce a yaw force moment.

12. A helicopter having a rotor means comprising: means for driving said rotor, means connected to said driving means for controlling the attitude of the helicopter about an axis generally transverse to the yaw axis of the helicopter, means responsive to the deviation of the helicopter in yaw from a predetermined reference position for producing a control signal representative thereof, and means connected to said driving means and responsive to the control signal for modifying the torque output of the rotor means for controlling the yaw motion of the helicopter.

13. A helicopter having a rotor means comprising: means for driving said rotor, means connected to said driving means for controlling the attitude of the helicopter about an axis generally transverse to the yaw axis of the helicopter, means responsive to the deviation of the helicopter in yaw from a predetermined reference position for producing a control signal representative thereof, and differentially operated means connected to said driving means and responsive to said control signal, an equal output of said differentially operated means modifying the torque output of the rotor means to vary only the yaw motion of the helicopter.

14. A helicopter having a rotor means comprising: means for driving said rotor, means connected to said driving means for controlling the attitude of the helicopter about an axis generally transverse to the yaw axis of the helicopter, means responsive to the deviation of the helicopter in yaw from a predetermined reference position for producing a control signal representative thereof, means responsive to the deviation of the helicopter from a predetermined reference position about said generally transverse axis for producing an attitude control signal, and first means connected to said driving means and to said means for producing said yaw deviation control signal and said means for producing said attitude control signal, said first means operating in response to said yaw deviation control signal for modifying the torque output of the rotor means for controlling the yaw motion of the helicopter, and said first means operating in response to said attitude control signal for operating said attitude control means.

15. An attitude control system for a helicopter which is tethered by a cable comprising: rotor means for producing a force to lift said helicopter, means for connecting said cable to said helicopter at a point thereon, said cable having a force thereon when said helicopter is in flight, means on said helicopter for sensing deviation of the helicopter in yaw from a predetermined reference position and for sensing deviation of the helicopter from a predetermined attitude about an axis generally transverse to the yaw axis of the helicopter, said sensing means also producing corresponding yaw and attitude deviation control signals, drive means connected to said rotor means, means connected to said sensing means and to said drive means and responsive to the yaw deviation control signal for modifying the torque output of the rotor means for controlling the yaw motion of the helicopter, and means connected to said drive means and to said sensing means and responsive to an attitude deviation control signal for shifting the effective connection point of the cable to said helicopter to cause the forces on the cable to react with the helicopter to vary the attitude of the helicopter about said axis generally transverse to said yaw axis.

References Cited by the Examiner

UNITED STATES PATENTS

| | | | |
|---|---|---|---|
| 2,635,836 | 4/1953 | Summers | 244—79 |
| 2,643,354 | 6/1953 | MacCallum et al. | 244—77 X |
| 3,002,711 | 10/1961 | Stefano | 244—17.23 |
| 3,053,480 | 9/1962 | Vanderlip | 244—17.13 |
| 3,126,966 | 3/1964 | Agamian | 170—135.25 X |

FOREIGN PATENTS 897,756  5/1962  Great Britain.

MILTON BUCHLER, *Primary Examiner.*

FERGUS S. MIDDLETON, *Examiner.*